UNITED STATES PATENT OFFICE.

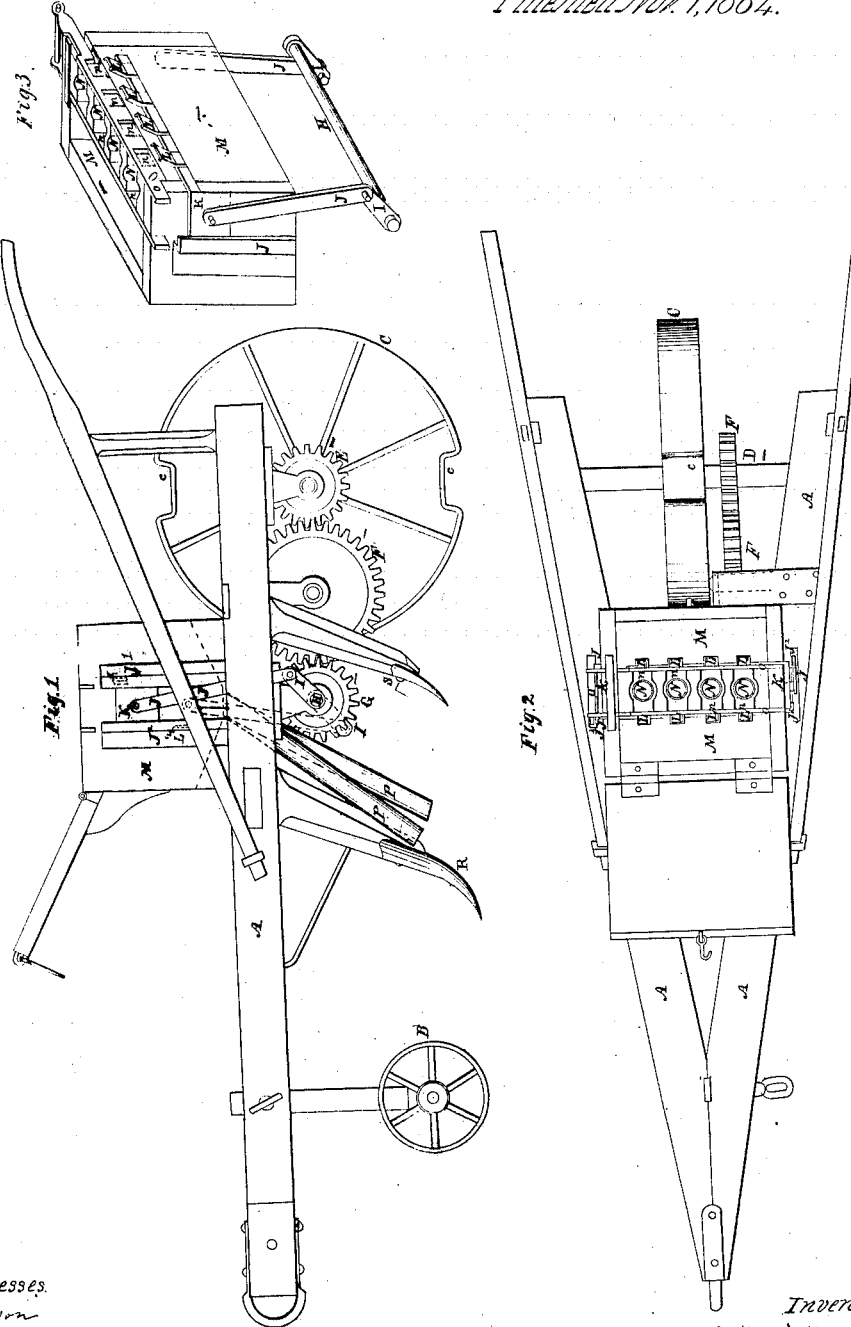

DANIEL W. AMOS, OF BEDFORD, PENNSYLVANIA.

CORN-PLANTER.

Specification forming part of Letters Patent No. 44,845, dated November 1, 1864; antedated October 18, 1864.

*To all whom it may concern:*

Be it known that I, DANIEL W. AMOS, of Bedford, in the county of Bedford and State of Pennsylvania, have invented certain new and useful Improvements in Corn-Planters, of which the following is a full, clear, and exact description, reference being had to the accompanying drawings, which make part of this specification, and in which—

Figure 1 represents a view in elevation of one side of a corn-planter embracing my improvements; Fig. 2, a plan or top view of the same; and Fig. 3, a view in perspective of the hopper and feeding mechanism, the rear portion of the hopper being removed at the line *x x* of Fig. 1 to show the interior.

In the accompanying drawings, a stout frame, A, is shown as mounted upon two wheels, B C. The wheel B supports the front end of the frame, which can be raised or lowered upon it in any usual or well-known manner to hold the frame at various heights from the ground. The driving-wheel C has indentations *c* formed on its periphery for the purpose of spauning the hills. In this instance two indentations only are shown, and on opposite sides of the wheel; but it is obvious that the number could be varied to suit the diameter of the wheel and the distance between the hills. The driving-wheel turns on an axle, D, which carries a spur-pinion, E, gearing in a spur-wheel, F, which in turn engages a corresponding pinion, G, mounted on a counter-shaft, H, which carries a crank, I, at each end. Each of these cranks is connected by a pitman, J, to one of the slides K of the feeding-cups L, the slides reciprocating vertically in guides J' on the ends of a hopper, M, mounted upon the frame. A series of boxes or conductors, N, are arranged centrally within the hopper. These conductors have openings *n* at each side, near the top, for the admission of the seed. These apertures can be closed, when desired, by a slide or cut-off, O. The feeding-cups work on each side of these conductors and feed the grain in alternately from either side. Each of the conductors is connected at the bottom to one of a nest or group of seed-tubes, P, the lower ends of which lie close together behind the furrowing-plow R, projecting underneath the center of the frame, so as to drop the seed into the furrow formed by the plow so that they lie in the form of a square, about four inches apart, in order that the growing stalks may not be crowded. A covering-plow, S, is arranged on each side of and behind the central plow, so as to cover the seed when planted. In the drawings four conductors and seed-tubes only are shown; but it is obvious that their number may be varied without departing from my invention.

The operation of the machine is as follows: The hopper M being filled with corn and the cut-off O open, as the machine advances the plow R opens a furrow, the feeding-cups L alternately descend on each side of the conductors into the grain, and as they rise each cup brings up a grain, which, as soon as the slide passes the openings *n* of the conductors N, drops into one of them and passes through one of the seed-tubes P to the ground. The furrow is then covered by the side plows, S, and the driving-wheel passes over it, the indented portion *c* of the wheel passing over the spot where the seed were dropped, by which means the earth at this spot is not compressed, but left in the form of a hill.

It will be observed that the combination of the driving-wheel with the feeding device by means of the gearing is such that they are bound to register correctly—that is to say, the arrangement is such that the same relation always exits between the indentations of the wheel and the movements of the feeding-slide.

Having thus described the construction and operation of my improved corn-planter, what I claim therein as new, and desire to secure by Letters Patent, is—

The combination of the indented driving-wheel, the gearing, the reciprocating feeding mechanism, and the cut-off with the seed-tubes, substantially in the manner described, for the purpose of feeding the corn grain by grain and securing an accurate register between the planting and covering devices, as set forth.

In testimony whereof I have hereunto subscribed my name.

DANIEL W. AMOS.

Witnesses:
 JNO. G. FISHER,
 JOHN HAFER.